US006892750B2

(12) United States Patent
Cash

(10) Patent No.: US 6,892,750 B2
(45) Date of Patent: May 17, 2005

(54) SWITCHING VALVE

(75) Inventor: James T. Cash, Hackettstown, NJ (US)

(73) Assignee: Megtec Systems, Inc., DePere, WI (US)

( * ) Notice: Subject to any disclaimer, the term of this patent is extended or adjusted under 35 U.S.C. 154(b) by 0 days.

(21) Appl. No.: 09/863,772

(22) Filed: May 23, 2001

(65) Prior Publication Data

US 2001/0044090 A1 Nov. 22, 2001

Related U.S. Application Data

(62) Division of application No. 09/572,129, filed on May 17, 2000, now Pat. No. 6,261,092.

(51) Int. Cl.[7] .............................................. F16K 11/00
(52) U.S. Cl. ....................................... 137/311; 251/250
(58) Field of Search ........................... 137/311, 246.22, 137/625.46; 251/250

(56) References Cited

U.S. PATENT DOCUMENTS

| | | | | | |
|---|---|---|---|---|---|
| 843,935 | A | * | 2/1907 | Fargo | 137/311 |
| 1,468,502 | A | * | 9/1923 | Keller | 251/250 |
| 1,542,452 | A | * | 6/1925 | Hively | 251/250 |
| 3,274,895 | A | * | 9/1966 | Hendrickson | 251/250 |
| 4,280,416 | A | | 7/1981 | Edgerton | 110/254 |
| 4,702,269 | A | * | 10/1987 | Schuler | 137/246.12 |
| 5,016,547 | A | * | 5/1991 | Thomason | 110/211 |
| 5,460,789 | A | * | 10/1995 | Wilhelm | 422/173 |
| 5,547,640 | A | | 8/1996 | Kim | 422/177 |
| 5,562,442 | A | * | 10/1996 | Wilhelm | 432/72 |
| 5,584,916 | A | | 12/1996 | Yamashita et al. | 96/123 |
| 5,871,347 | A | | 2/1999 | Chen et al. | 432/72 |
| 5,871,349 | A | | 2/1999 | Johnson et al. | 432/180 |
| 5,983,986 | A | * | 11/1999 | Macintyre et al. | 165/9 |
| 6,203,316 | B1 | * | 3/2001 | Pennington | 432/180 |
| 6,298,877 | B1 | * | 10/2001 | Inuki et al. | 137/625.11 |

* cited by examiner

*Primary Examiner*—John Fox
(74) *Attorney, Agent, or Firm*—Mitchell D. Bittman; Kevin S. Lemack

(57) ABSTRACT

Switching valve and a regenerative thermal oxidizer including the switching valve. The valve of the present invention exhibits excellent sealing characteristics and minimizes wear. The valve has a seal plate that defines two chambers, each chamber being a flow port that leads to one of two regenerative beds of the oxidizer. The valve also includes a switching flow distributor which provides alternate channeling of the inlet or outlet process gas to each half of the seal plate. The valve operates between two modes: a stationary mode and a valve movement mode. In the stationary mode, a tight gas seal is used to minimize or prevent process gas leakage. The gas seal also seals during valve movement.

16 Claims, 10 Drawing Sheets

SWITCHING VALVE

This is a division, of application Ser. No. 09/572129, filed May 17, 2000 now U.S. Pat. No. 6,261,092.

BACKGROUND OF THE INVENTION

Regenerative thermal oxidizers are conventionally used for destroying volatile organic compounds (VOCs) in high flow, low concentration emissions from industrial and power plants. Such oxidizers typically require high oxidation temperatures in order to achieve high VOC destruction. To achieve high heat recovery efficiency, the "dirty" process gas which is to be treated is preheated before oxidation. A heat exchanger column is typically provided to preheat these gases. The column is usually packed with a heat exchange material having good thermal and mechanical stability and sufficient thermal mass. In operation, the process gas is fed through a previously heated heat exchanger column, which, in turn, heats the process gas to a temperature approaching or attaining its VOC oxidation temperature. This pre-heated process gas is then directed into a combustion zone where any incomplete VOC oxidation is usually completed. The treated now "clean" gas is then directed out of the combustion zone and back through the heat exchanger column, or through a second heat exchange column. As the hot oxidized gas continues through this column, the gas transfers its heat to the heat exchange media in that column, cooling the gas and pre-heating the heat exchange media so that another batch of process gas may be preheated prior to the oxidation treatment. Usually, a regenerative thermal oxidizer has at least two heat exchanger columns which alternately receive process and treated gases. This process is continuously carried out, allowing a large volume of process gas to be efficiently treated.

The performance of a regenerative oxidizer may be optimized by increasing VOC destruction efficiency and by reducing operating and capital costs. The art of increasing VOC destruction efficiency has been addressed in the literature using, for example, means such as improved oxidation systems and purge systems (e.g., entrapment chambers), and three or more heat exchangers to handle the untreated volume of gas within the oxidizer during switchover. Operating costs can be reduced by increasing the heat recovery efficiency, and by reducing the pressure drop across the oxidizer. Operating and capital costs may be reduced by properly designing the oxidizer and by selecting appropriate heat transfer packing materials.

An important element of an efficient oxidizer is the valving used to switch the flow of process gas from one heat exchange column to another. Any leakage of untreated process gas through the valve system will decrease the efficiency of the apparatus. In addition, disturbances and fluctuations in the pressure and/or flow in the system can be caused during valve switchover and are undesirable. Valve wear is also problematic, especially in view of the high frequency of valve switching in regenerative thermal oxidizer applications.

One conventional two-column design uses a pair of poppet valves, one associated with a first heat exchange column, and one with a second heat exchange column. Although poppet valves exhibit quick actuation, as the valves are being switched during a cycle, leakage of untreated process gas across the valves inevitably occurs. For example, in a two chamber oxidizer during a cycle, there is a point in time where both the inlet valve(s) and the outlet valve(s) are partially open. At this point, there is no resistance to process gas flow, and that flow proceeds directly from the inlet to the outlet without being processed. Since there is also ducting associated with the valving system, the volume of untreated gas both within the poppet valve housing and within the associated ducting represents potential leakage volume. Since leakage of untreated process gas across the valves leaves allows the gas to be exhausted from the device untreated, such leakage which will substantially reduce the destruction efficiency of the apparatus. In addition, conventional valve designs result in a pressure surge during switchover, which exasperates this leakage potential.

Similar leakage potential exists with conventional rotary valve systems. Moreover, such rotary valve systems typically include many internal dividers which can leak over time, and are expensive to construct and maintain. For example, in U.S. Pat. No. 5,871,349, FIG. 1 illustrates an oxidizer with twelve chambers having twelve metallic walls, each of which can be a weak point for leakage.

It would therefore be desirable to provide a regenerative thermal oxidizer that has the simplicity and cost effectiveness of a two chamber device, and the smooth control and high VOC removal of a rotary valve system, without the disadvantages of each.

SUMMARY OF THE INVENTION

The problems of the prior art have been overcome by the present invention, which provides a single switching valve and a regenerative thermal oxidizer including the switching valve. The valve of the present invention exhibits excellent sealing characteristics and minimizes wear. The valve has a seal plate that defines two chambers, each chamber being a flow port that leads to one of two regenerative beds of the oxidizer. The valve also includes a switching flow distributor which provides alternate channeling of the inlet or outlet process gas to each half of the seal plate. The valve operates between two modes: a stationary mode and a valve movement mode. In the stationary mode, a tight gas seal is used to minimize or prevent process gas leakage. The gas seal also seals during valve movement. The valve is a compact design, thereby eliminating ducting typically required in conventional designs. This provides less volume for the process gas to occupy during cycling, which leads to less dirty process gas left untreated during cycling. Associated baffling minimizes or eliminates untreated process gas leakage across the valve during switchover. The use of a single valve, rather than the two or four conventionally used, significantly reduces the area that requires sealing. The geometry of the switching flow distributor reduces the distance and number of turns the process gas goes through since the flow distributor can be located close to the heat exchange beds. This reduces the volume of trapped, untreated gas during valve switching. Since the process gas passes through the same valve ports in the inlet cycle as in the outlet cycle, gas distribution to the heat exchange beds is improved.

Valve switching with minimal pressure fluctuations, excellent sealing, and minimal or no bypass during switching are achieved. In view of the elimination of bypass during switching, the conventional entrapment chambers used to store the volume of unprocessed gas in the system during switching can be eliminated, thereby saving substantial costs.

BRIEF DESCRIPTION OF THE DRAWINGS

FIG. 11 is a cross-sectional view of the rotating port in accordance with the present invention; and FIG. 12 is a cross-sectional view of the lower portion of the drive shaft in accordance with the present invention.

DETAILED DESCRIPTION OF THE PRESENT INVENTION

Figure 1:
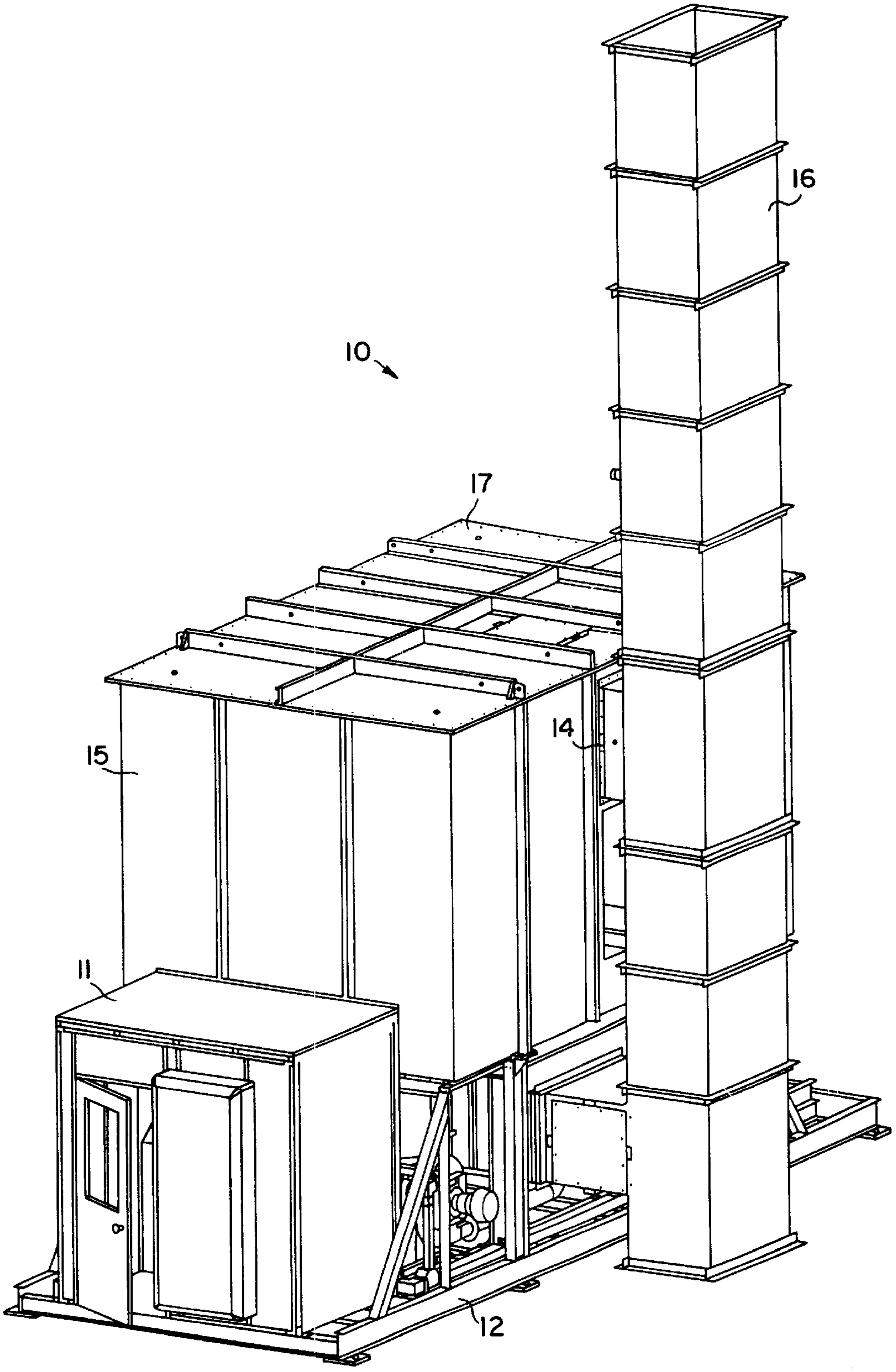
FIG. 1 is a perspective view of a regenerative thermal oxidizer in accordance with one embodiment of the present invention.
Figure 2:
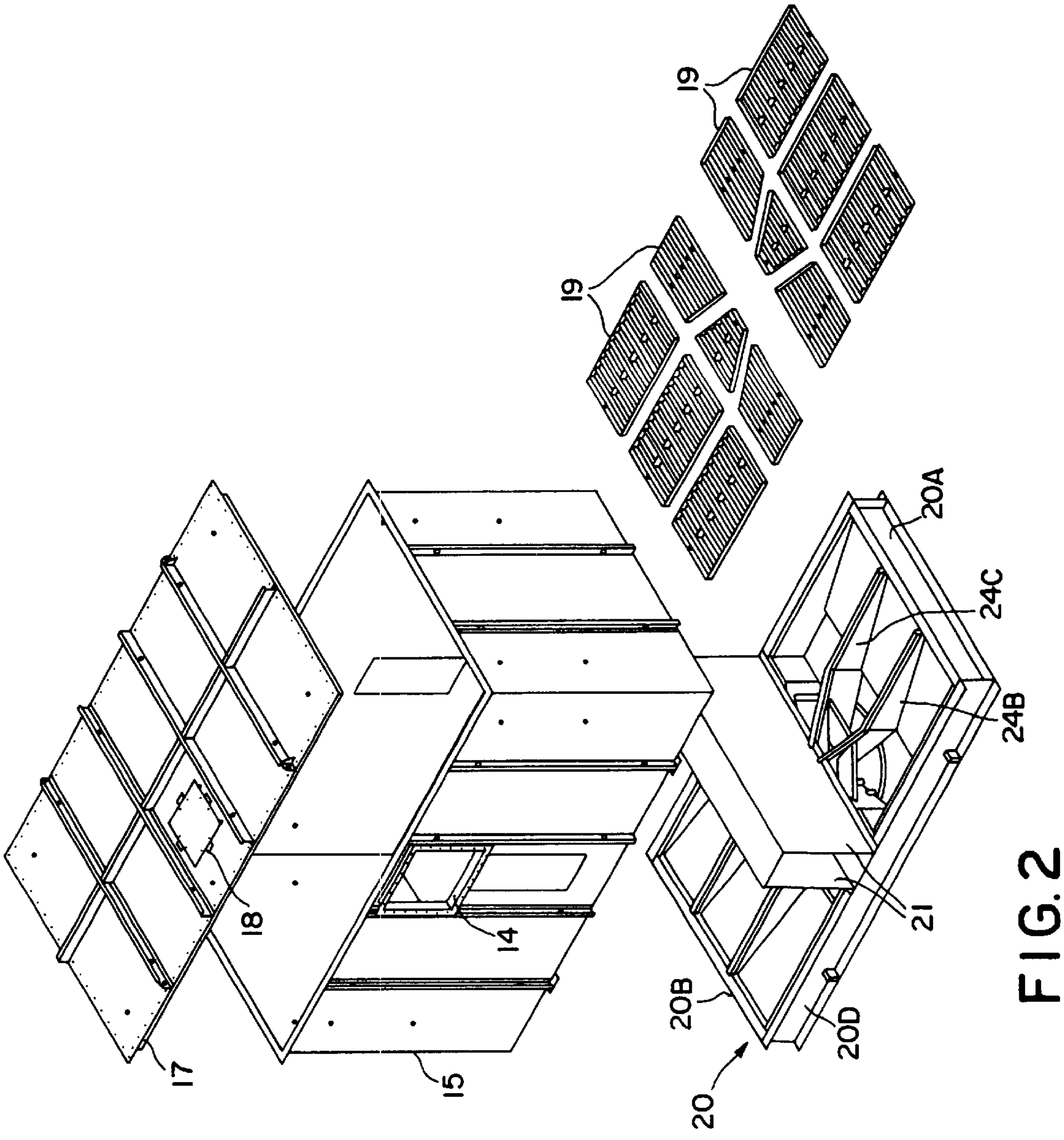
FIG. 2 is a perspective exploded view of a portion of a regenerative thermal oxidizer in accordance with one embodiment of the present invention.

Turning first to FIGS. 1 and 2, there is shown a two-chamber regenerative thermal oxidizer 10 (catalytic or non-catalytic) supported on a frame 12 as shown. The oxidizer 10 includes a housing 15 in which there are first and second heat exchanger chambers in communication with a centrally located combustion zone. A burner (not shown) may be associated with the combustion zone, and a combustion blower may be supported on the frame 12 to supply combustion air to the burner. The combustion zone includes a bypass outlet 14 in fluid communication with exhaust stack 16 typically leading to atmosphere. A control cabinet 11 houses the controls for the apparatus and is also preferably located on frame 12. Opposite control cabinet 11 is a fan (not shown) supported on frame 12 for driving the process gas into the oxidizer 10. Housing 15 includes a top chamber or roof 17 having one or more access doors 18 providing operator access into the housing 15. Those skilled in the art will appreciate that the foregoing description of the oxidizer is for illustrative purposes only; other designs are well within the scope of the present invention, including oxidizers with more or less than two chambers, oxidizers with horizontally oriented chamber(s), and catalytic oxidizers.

A cold face plenum 20 forms the base of housing 15 as best seen in FIG. 2. Suitable support grating 19 is provided on the cold face plenum 20 and supports the heat exchange matrix in each heat exchange column as is discussed in greater detail below. In the embodiment shown, the heat exchange chambers are separated by separation walls 21, which are preferably insulated. Also in the embodiment shown, flow through the heat exchange beds is vertical; process gas enters the beds from the valve ports located in the cold face plenum 20, flows upwardly (towards roof 17) into a first bed, enters the combustion zone in communication with the first bed, flows out of the combustion zone and into a second chamber, where it flows downwardly through a second bed towards the cold face plenum 20. However, those skilled in the art will appreciate that other orientations are suitable including a horizontal arrangement, such as one where the heat exchange columns face each other and are separated by a centrally located combustion zone.

Figure 3:
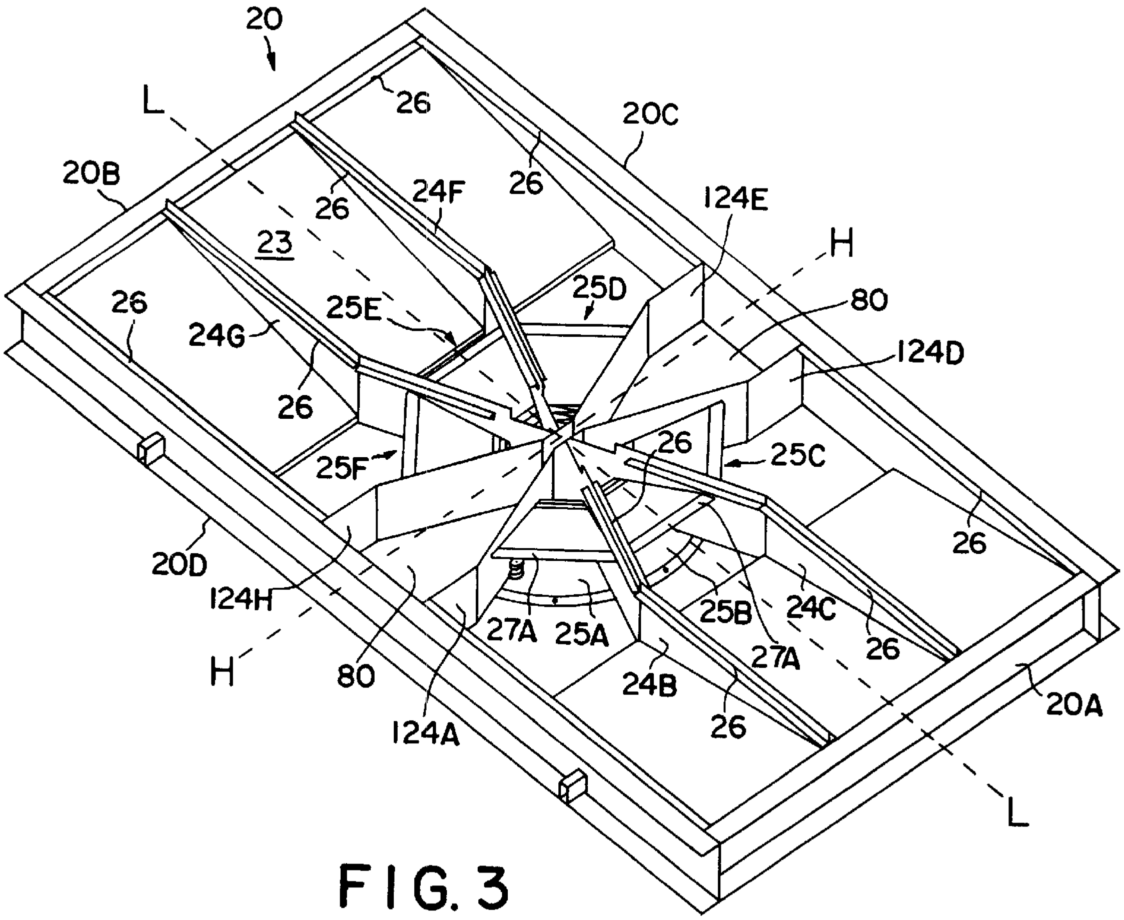
FIG. 3 is a perspective view of the cold face plenum in accordance with the present invention.

Turning now to FIG. 3, the details of the cold face plenum 20 will be discussed. The plenum 20 has a floor 23 which is preferably sloped downwardly from outside walls 20A, 20B towards the valve ports 25 to assist in gas flow distribution. Supported on floor 23 are a plurality of divider baffles 24, and chamber dividers 124. The divider baffles 24 separate the valve ports 25, and help reduce pressure fluctuations during valve switching. The chamber dividers 124 separate the heat exchange chambers. Chamber dividers 124A and 124D, and 124E and 124H, may be respectively connected with each other or separate. Valve port 25A is defined between chamber divider 124A and baffle 24B; valve port 25B is defined between baffles 24B and 24C; valve port 25C is defined between baffle 24C and chamber divider 124D; valve port 25D is defined between chamber divider 124E and baffle 24F; valve port 25E is defined between baffles 24F and 24G; and valve port 25F is defined between baffle 24G and chamber divider 124H. The number of divider baffles 24 is a function of the number of valve ports 25. In the preferred embodiment as shown, there are six valve ports 25, although more or less could be used. For example, in an embodiment where only four valve ports are used, only one divider baffle would be necessary. Regardless of the number of valve ports and corresponding divider baffles, preferably the valve ports are equally shaped for symmetry.

The height of the baffles is preferably such that the top surface of the baffles together define a level horizontal plane. In the embodiment shown, the portion of the baffles farthest from the valve ports is the shortest, to accommodate the floor 23 of the cold face plenum which is sloped as discussed above. The level horizontal plane thus formed is suitable for supporting the heat exchange media in each heat exchange column as discussed in greater detail below. In the six valve port embodiment shown, baffles 24B, 24C, 24F and 24G are preferably angled at about 45° to the longitudinal centerline L—L of the cold face plenum 20 as they extend from the valve ports 25, and then continue substantially parallel to the longitudinal centerline L—L as the extend toward outside walls 20A and 20B, respectively. Baffles 24A, 24D, 24E and 24H are preferably angled at about 22.5° to the latitudinal centerline H—H of the cold face plenum 20 as they extend from the valve ports 25, and then continue substantially parallel to the latitudinal centerline H—H as the extend toward outside walls 20C and 20D, respectively.

Preferably the baffles 24B, 24C, 24F and 24G, as well as the walls 20A, 20B, 20C and 20D of the cold face plenum 20, include a lip 26 extending slightly lower than the horizontal plane defined by the top surface of the baffles 25. The lip 26 accommodates and supports an optional cold face support grid 19 (FIG. 2), which in turn supports the heat exchange media in each column. In the event the heat exchange media includes randomly packed media such as ceramic saddles, spheres or other shapes, the baffles 24 can extend higher to separate the media. However, perfect sealing between baffles is not necessary as it is in conventional rotary valve designs.

Figure 4:
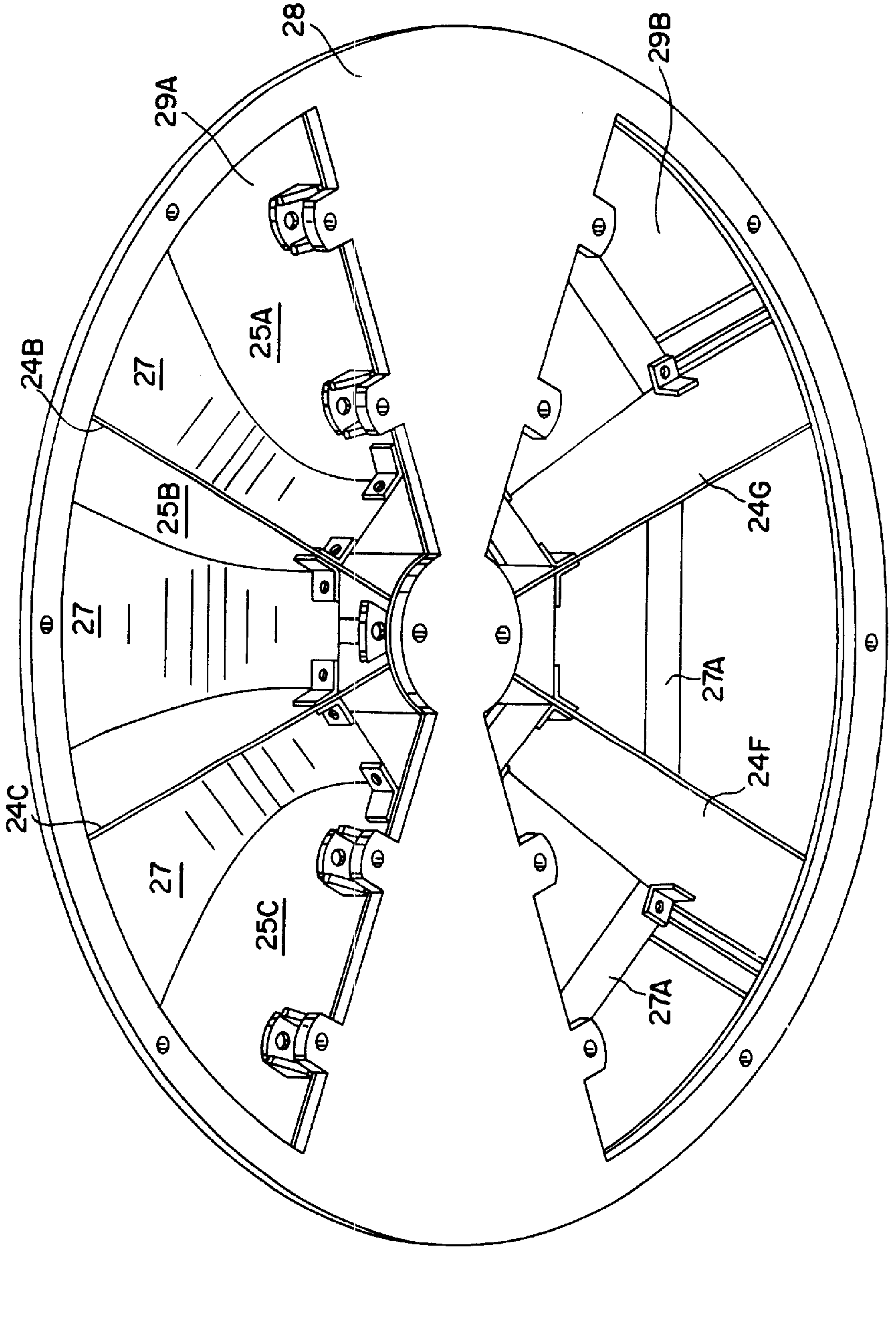
FIG. 4 is a bottom perspective view of the valve ports in accordance with the present invention.

FIG. 4 is a view of the valve ports 25 from the bottom. Plate 28 has two opposite symmetrical openings 29A and 29B, which, with the baffles 26, define the valve ports 25. Situated in each valve port 25 is an optional turn vane 27.

Each turn vane 27 has a first end secured to the plate 28, and a second end spaced from the first end secured to the baffle 24 on each side (best seen in FIG. 3). Each turn vane 27 widens from its first end toward its second end, and is angled upwardly at an angle and then flattens to horizontal at 27A as shown in FIGS. 3 and 4. The turn vanes 27 act to direct the flow of process gas emanating from the valve ports away from the valve ports to assist in distribution across the cold face plenum during operation. Uniform distribution into the cold face plenum 20 helps ensure uniform distribution through the heat exchange media for optimum heat exchange efficiency.

Figure 5:
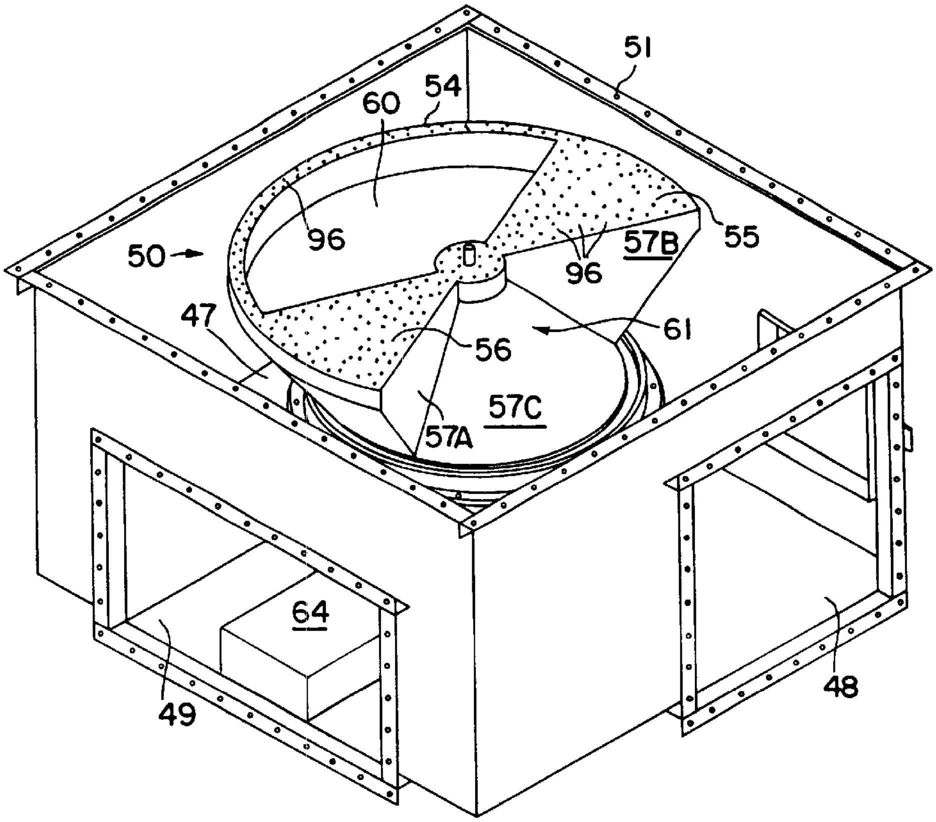
FIG. 5 is a perspective view of the flow distributor switching valve in accordance with the present invention.
Figure 5A:
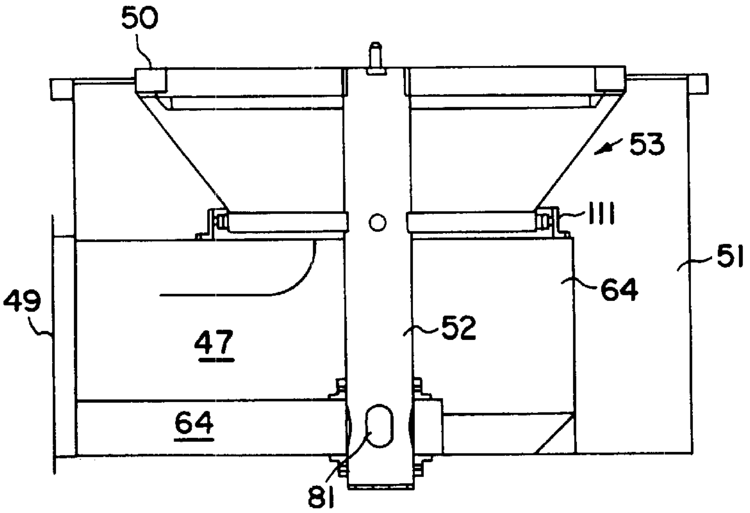
FIG. 5A is a cross-sectional view of the flow distributor switching valve in accordance with the present invention.

FIGS. 5 and 5A show the flow distributor 50 contained in a manifold 51 having a process gas inlet 48 and a process gas outlet 49 (although element 48 could be the outlet and 49 the inlet, for purposes of illustration the former embodiment will be used herein). The flow distributor 50 includes a preferably hollow cylindrical drive shaft 52 (FIGS. 5A, 10) that is coupled to a drive mechanism discussed in greater detail below. Coupled to the drive shaft 52 is a partial frusto-conically shaped member 53. The member 53 includes a mating plate formed of two opposite pie-shaped sealing surfaces 55, 56, each connected by circular outer edge 54 and extending outwardly from the drive shaft 52 at an angle of 45°, such that the void defined by the two sealing surfaces 55, 56 and outer edge 54 defines a first gas route or passageway 60. Similarly, a second gas route or passageway 61 is defined by the sealing surfaces 55, 56 opposite the first passageway, and three angled side plates, namely, opposite angled side plates 57A, 57B, and central angled side plate 57C. The angled sides plates 57 separate passageway 60 from passageway 61. The top of these passageways 60, 61 are designed to match the configuration of symmetrical openings 29A, 29B in the plate 28, and in the assembled condition, each passageway 60, 61 is aligned with a respective openings 29A, 29B. Passageway 61 is in fluid communication with only inlet 48, and passageway 60 is in fluid communication with only outlet 49 via plenum 47, regardless of the orientation of the flow distributor 50 at any given time. Thus, process gas entering the manifold 51 through inlet 48 flows through only passageway 61, and process gas entering passageway 60 from the valve ports 25 flows only through outlet 49 via plenum 47.

A sealing plate 100 (FIG. 9) is coupled to the plate 28 defining the valve ports 25 (FIG. 4). Preferably an air seal is used between the top surface of the flow distributor 50 and the seal plate 100, as discussed in greater detail below. The flow distributor is rotatable about a vertical axis, via drive shaft 52, with respect to the stationary plate 28. Such rotation moves the sealing surfaces 55, 56 into and out of blocking alignment with portions of openings 29A, 29B as discussed below.

Figure 6:
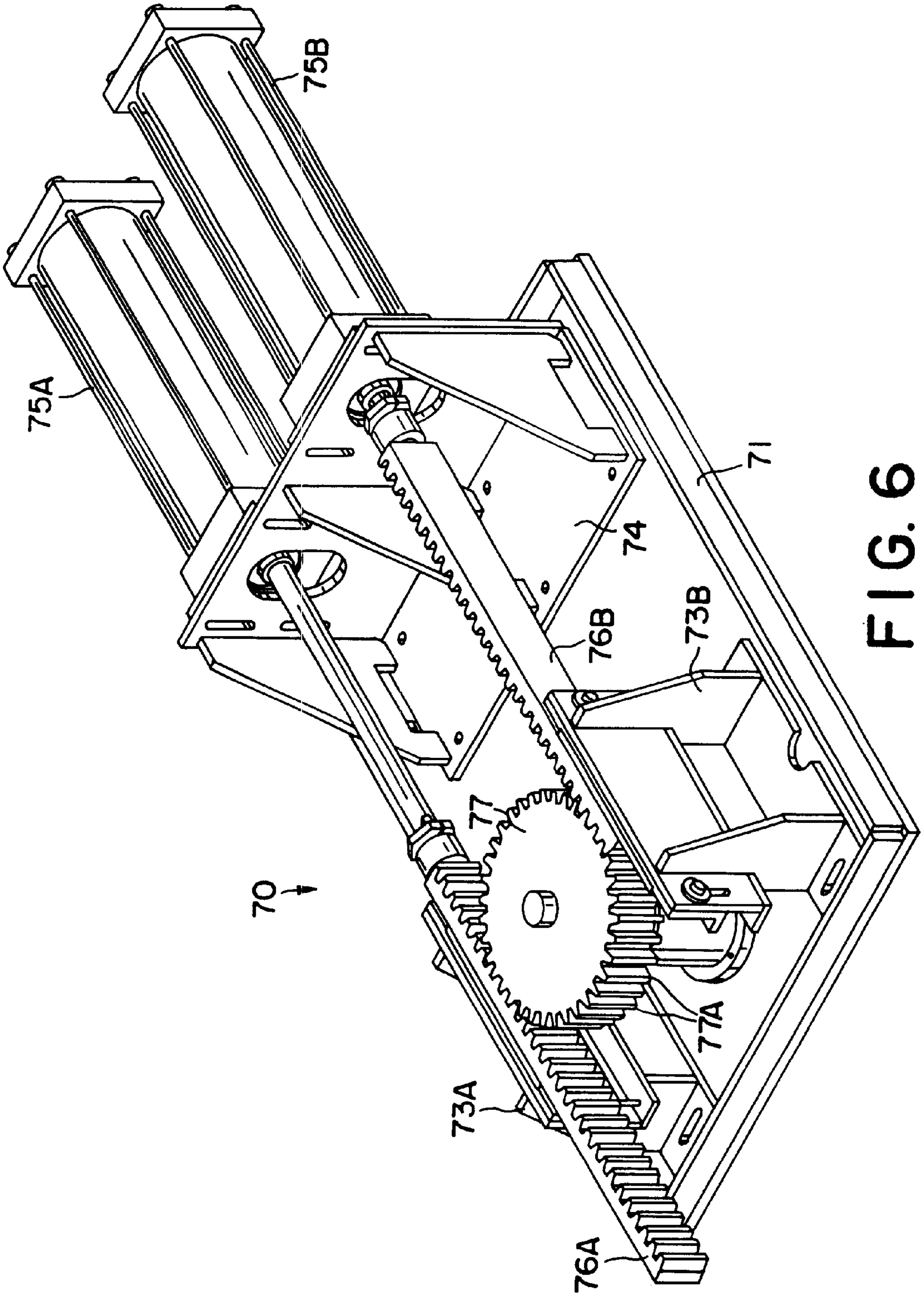
FIG. 6 is a perspective view of the switching valve drive mechanism in accordance with the present invention.

Turning now to FIG. 6, a suitable drive mechanism for driving the flow distributor 50 is shown. The drive mechanism 70 includes a base 71 and is supported on frame 12 (FIG. 1). Coupled to base 71 are a pair of rack supports 73A, 73B and a cylinder support 74. Cylinders 75A, 75B are supported by cylinder support 74, and actuate a respective rack 76A, 76B. Each rack has a plurality of grooves which correspond in shape to the spurs 77A on spur gear 77. The drive shaft 52 of the flow distributor 50 is coupled to the spur gear 77. Actuation of the cylinders 75A, 75B causes movement of the respective rack 76 attached thereto, which in turn causes rotational movement of spur gear 77, which rotates the drive shaft 52 and flow distributor 50 attached thereto about a vertical axis. Preferably the rack and pinion design is configured to cause a back-and-forth 180° rotation of the drive shaft 52. However, those skilled in the art will appreciate that other designs are within the scope of the present invention, including a drive wherein full 360° rotation of the flow distributor is accomplished. Other suitable drive mechanisms include hydraulic actuators and indexers.

Figure 7A:
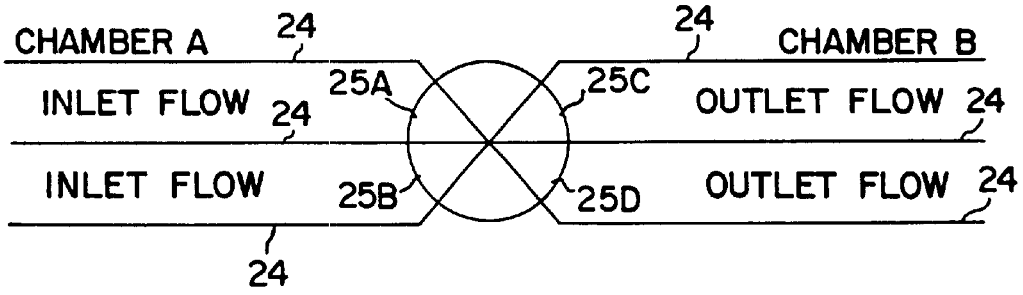
FIGS. 7A, 7B, 7C and 7D are schematic diagrams of the flow through the switching valve in accordance with the present invention.

FIGS. 7A–7D illustrate schematically the flow direction during a typical switching cycle for a valve having two inlet ports and two outlet ports. In these diagrams, chamber A is the inlet chamber and chamber B is the outlet chamber of a two column oxidizer. FIG. 7A illustrates the valve in its fully open, stationary position. Thus, valve ports 25A and 25B are in the full open inlet mode, and valve ports 25C and 25D are in the full open outlet mode. Process gas enters chamber A through valve ports 25A and 25B, flows through the heat exchange media in chamber A where it is heated, flows through a combustion zone in communication with chamber A where any volatile components not already oxidized are oxidized, is cooled as it flows through chamber B in communication with the combustion zone, and then flows out valve ports 25C and 25D into an exhaust stack opening to atmosphere, for example. The typical duration of this mode of operation is from about 1 to about 4 minutes, with about 3 minutes being preferred.

Figure 7B:
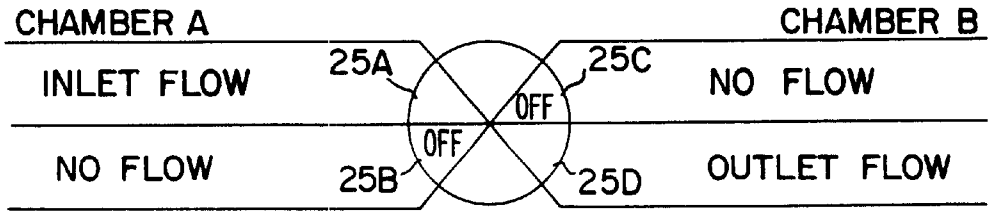

FIG. 7B illustrates the beginning of a mode change, where a valve rotation of 60° takes place, which generally takes from about 0.5 to about 2 seconds. In the position shown, valve port 25B is closed, and thus flow to or from chamber A is blocked through this port, and valve port 25C is closed, and thus flow to or from chamber B is blocked through this port. Valve ports 25A and 25D remain open.

Figure 7C:
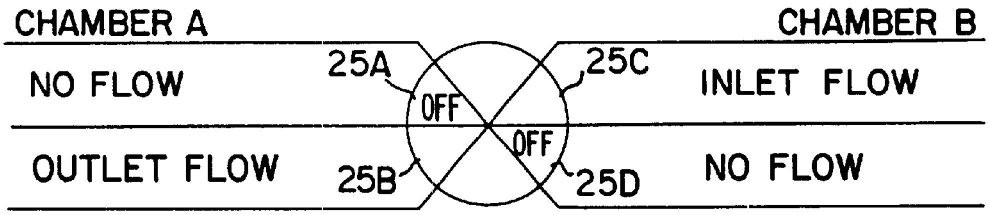

As the rotation of the flow distributor continues another 60°, FIG. 7C shows that valve ports 25A and 25D are now blocked. However, valve port 25B is now open, but is in an outlet mode, only allowing process gas from chamber A to flow out through the port 25B and into an exhaust stack or the like. Similarly, valve port 25C is now open, but is in an inlet mode, only allowing flow of process gas into chamber B (and not out of chamber B as was the case when in the outlet mode of FIG. 7A).

Figure 7D:
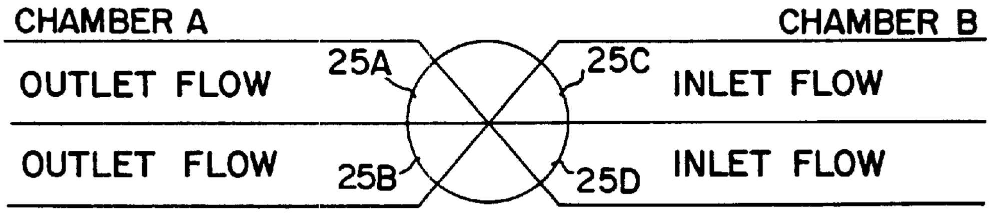

The final 60° rotation of the flow distributor is illustrated in FIG. 7D. Chamber A is now in the fully open outlet mode, and chamber B in the fully open inlet mode. Thus, valve ports 25A, 25B, 25C and 25D are all fully open, and the flow distributor is at rest. When the flow is to be again reversed, the flow distributor preferably returns to the position in FIG. 7A by rotating 180° back from the direction it came, although a continued rotation of 180° in the same direction as the previous rotation is within the scope of the present invention.

The six valve port system of FIG. 3 would operate in an analogous fashion. Thus, each valve port would be 45° rather than 60°. Assuming valve ports 25A, 25B and 25C in FIG. 3 are in the inlet mode and fully open, and valve ports 25D, 25E and 25F are in the outlet mode and fully open, the first step in the cycle is a valve turn of 45° (clockwise), blocking flow to valve port 25C and from valve port 25F. Valve ports 25A and 25B remain in the inlet open position, and valve ports 25D and 25E remain in the outlet open position. As the flow distributor rotates an additional 45° clockwise, valve port 25C is now in the open outlet position, valve port 25B is blocked, and valve port 25A remains in the open inlet position. Similarly, valve port 25F is now in the open inlet position, valve port 25E is blocked, and valve port 25D remains in the open outlet position. As the flow distributor continues another 45°, valve ports 25C and 25B are now in the open outlet position, and valve port 25A is blocked. Similarly, valve ports 25F and 25E are now in the open inlet position, and valve port 25F is blocked. In the final position, the flow distributor has rotated an additional 45° and come to a stop, wherein all of valve ports 25A, 25B and 25C are in the open outlet position, and all of valve ports 25D, 25E and 25F are in the open inlet position.

As can be seen from the foregoing, one substantial advantage of the present invention over conventional rotary valves is that the instant flow distributor is stationary most of the time. It moves only during an inlet-to-outlet cycle changeover, and that movement lasts only seconds (generally a total of from about 0.5 to about 4 seconds) compared to the minutes during which it is stationary while one of chamber A or chamber B is in the inlet mode and the other in an outlet mode. In contrast, many of the conventional rotary valves are constantly moving, which accelerates wear of the various components of the apparatus and can lead to leakage. An additional benefit of the present invention is the large physical space separating the gas that has been cleaned from the process gas not yet cleaned, in both the valve itself and the chamber (the space 80 (FIG. 3) between chamber dividers 124E and 124D, and dividers 124H and 124A), and the double wall formed by chamber dividers 124E, 124H and 124A, 124D. Also, since the valve has only one actuation system, the valve will successfully function if it moves fast or slow, unlike the prior art, where multiple actuation systems must work together. More specifically, in the prior art, if one poppet valve is sluggish relative to another, for example, there could be leakage or loss of process flow or a large pressure pulse could be created.

Another advantage of the present invention is the resistance that is present during a switching operation. In conventional valving such as the poppet valving mentioned above, the resistance to flow approaches zero as both valves are partially open (i.e., when one is closing and one is opening). As a result, the flow of gas per unit time can actually increase, further exasperating the leakage of that gas across both partially opened valves during the switch. In contrast, since the flow director of the present invention gradually closes an inlet (or an outlet) by closing only portions at a time, resistance does not decrease to zero during a switch, and is actually increased thereby restricting the flow of process gas across the valve ports during switching and minimizing leakage.

Figure 8:
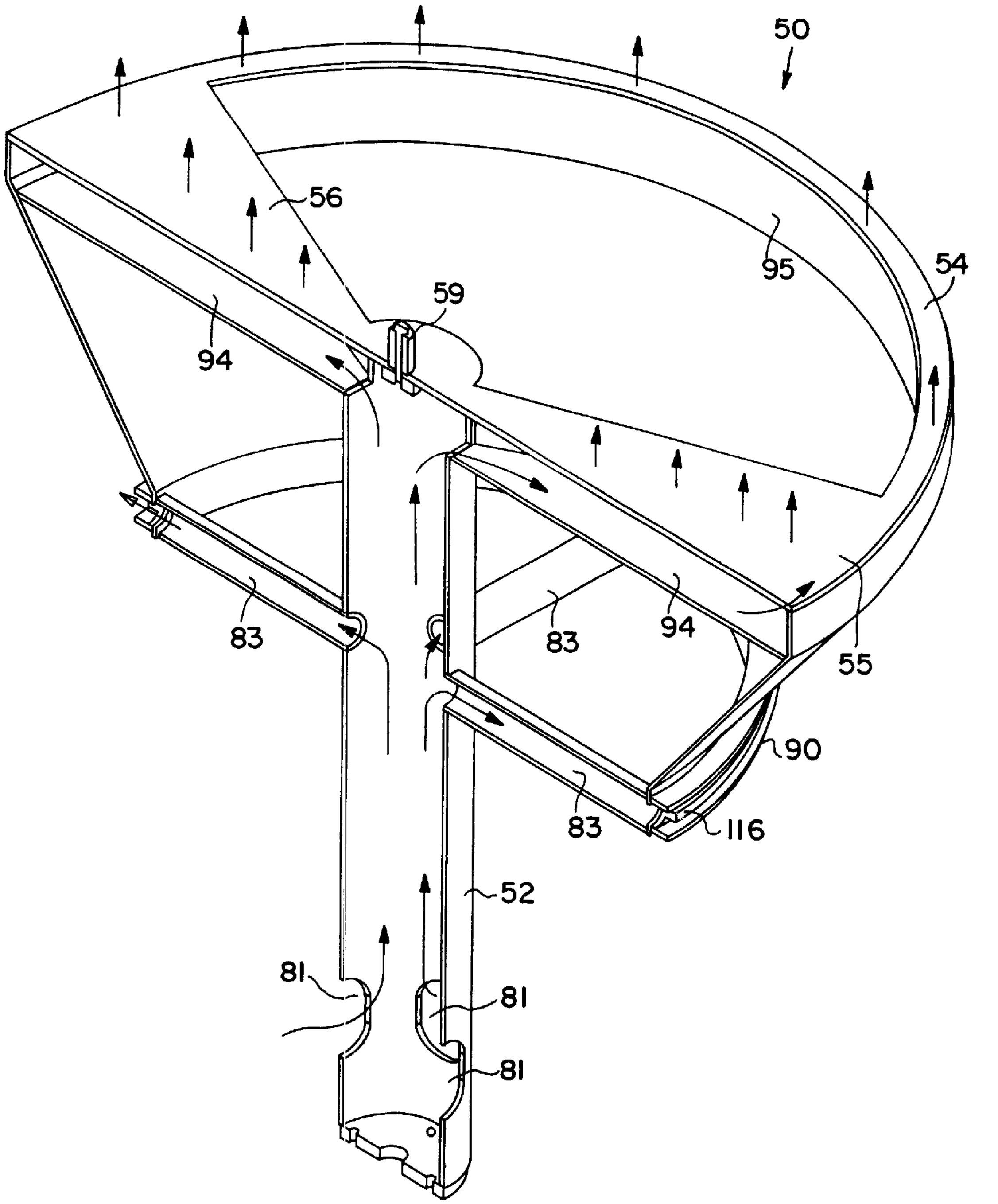
FIG. 8 is a perspective view of a portion of the flow distributor in accordance with the present invention.
Figure 9A:
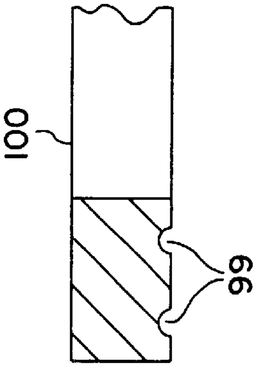
FIG. 9A is a cross-sectional view of a portion of the seal plate of FIG. 9.
Figure 9:
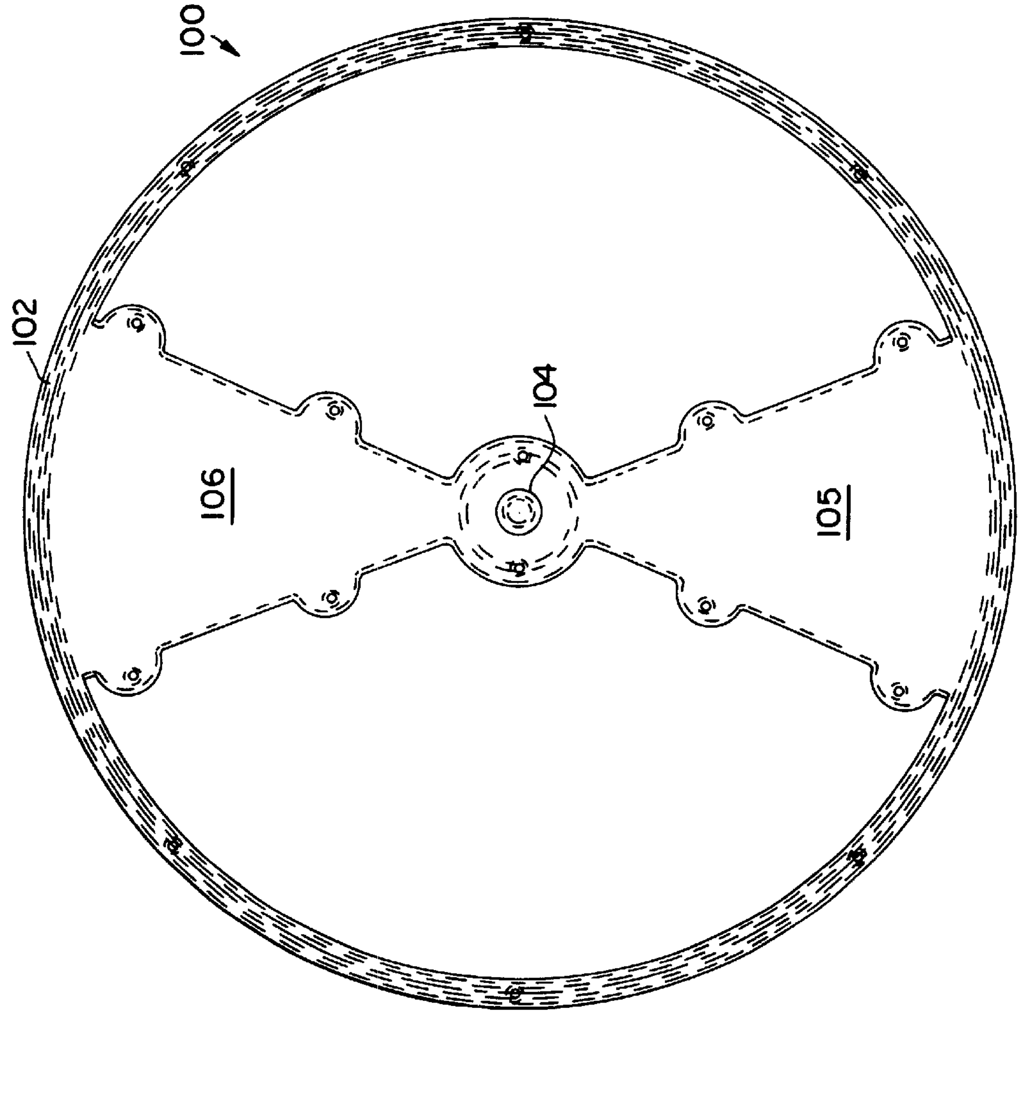
FIG. 9 is a top view of the seal plate in accordance with the present invention.

The preferred method for sealing the valve will now be discussed first with reference to FIGS. 5, 8 and 9. The flow distributor 50 rides on a cushion of air, in order to minimize or eliminate wear as the flow distributor moves. Those skilled in the art will appreciate that gases other than air could be used, although air is preferred and will be referred to herein for purposes of illustration. A cushion of air not only seals the valve, but also results in frictionless or substantially frictionless flow distributor movement. A pressurized delivery system, such as a fan or the like, which can be the same or different from the fan used to supply the combustion air to the combustion zone burner, supplies air to the drive shaft 52 of the flow distributor 50 via suitable ducting (not shown) and plenum 64. As best seen in FIG. 8, the air travels from the ducting into the drive shaft 52 via one or more apertures 81 formed in the body of the drive shaft 52 above the base 82 of the drive shaft 52 that is coupled to the drive mechanism 70. The exact location of the apertures (s) 81 is not particularly limited, although preferably the apertures 18 are symmetrically located about the shaft 52 and are equally sized for uniformity. The pressurized air flows up the shaft as depicted by the arrows in FIG. 8, and a portion enters on or more radial ducts 83 which communicate with and feed one or more piston rings seals located at the annular rotating port 90 as discussed in greater detail below. A portion of the air that does not enter the radial ducts 83 continues up the drive shaft 52 until it reaches passageways 94, which distribute the air in a channel having a semi-annular portion 95 and a portion defined by the pie-shaped wedges 55, 56.

The mating surface of the flow distributor 50, in particular, the mating surfaces of pie-shaped wedges 55, 56 and outer annular edge 54, are formed with a plurality of apertures 96 as shown in FIG. 5. The pressurized air from channel 95 escapes from channel 95 through these apertures 96 as shown by the arrows in FIG. 8, and creates a cushion of air between the top surface of the flow distributor 50 and a stationary seal plate 100 shown in FIG. 9. The seal plate 100 includes an annular outer edge 102 having a width corresponding to the width of the top surface 54 of the flow distributor 50, and a pair of pie-shaped elements 105, 106 corresponding in shape to pie-shaped wedges 55, 56 of the flow distributor 50. It matches (and is coupled to) plate 28 (FIG. 4) of the valve port. Aperture 104 receives shaft pin 59 (FIG. 8) coupled to the flow distributor 50. The underside of the annular outer edge 102 facing the flow distributor includes one or more annular grooves 99 (FIG. 9A) which align with the apertures 96 in the mating surface of the flow distributor 50. Preferably there are two concentric rows of grooves 99, and two corresponding rows of apertures 96. Thus, the grooves 99 aid in causing the air escaping from apertures 96 in the top surface 54 to form a cushion of air between the mating surface 54 and the annular outer edge 102 of the seal plate 100. In addition, the air escaping the apertures 96 in the pie-shaped portions 55, 56 forms a cushion of air between the pie-shaped portions 55, 56 and the pie-shaped portions 105, 106 of the seal plate 100. These cushions of air minimize or prevent leakage of the process gas that has not been cleaned into the flow of clean process gas. The relatively large pie-shaped wedges of both the flow distributor 50 and the seal plate 100 provide a long path across the top of the flow distributor 50 that uncleaned gas would have to traverse in order to cause leakage. Since the flow distributor is stationary the majority of time during operation, an impenetrable cushion of air is created between all of the valve mating surfaces. When the flow distributor is required to move, the cushion of air used to seal the valve now also functions to eliminate any high contact pressures from creating wear between the flow distributor 50 and the seal plate 100.

Preferably the pressurized air is delivered from a fan different from that delivering the process gas to the apparatus in which the valve is used, so that the pressure of the sealing air is higher than the inlet or outlet process gas pressure, thereby providing a positive seal.

Figure 10:
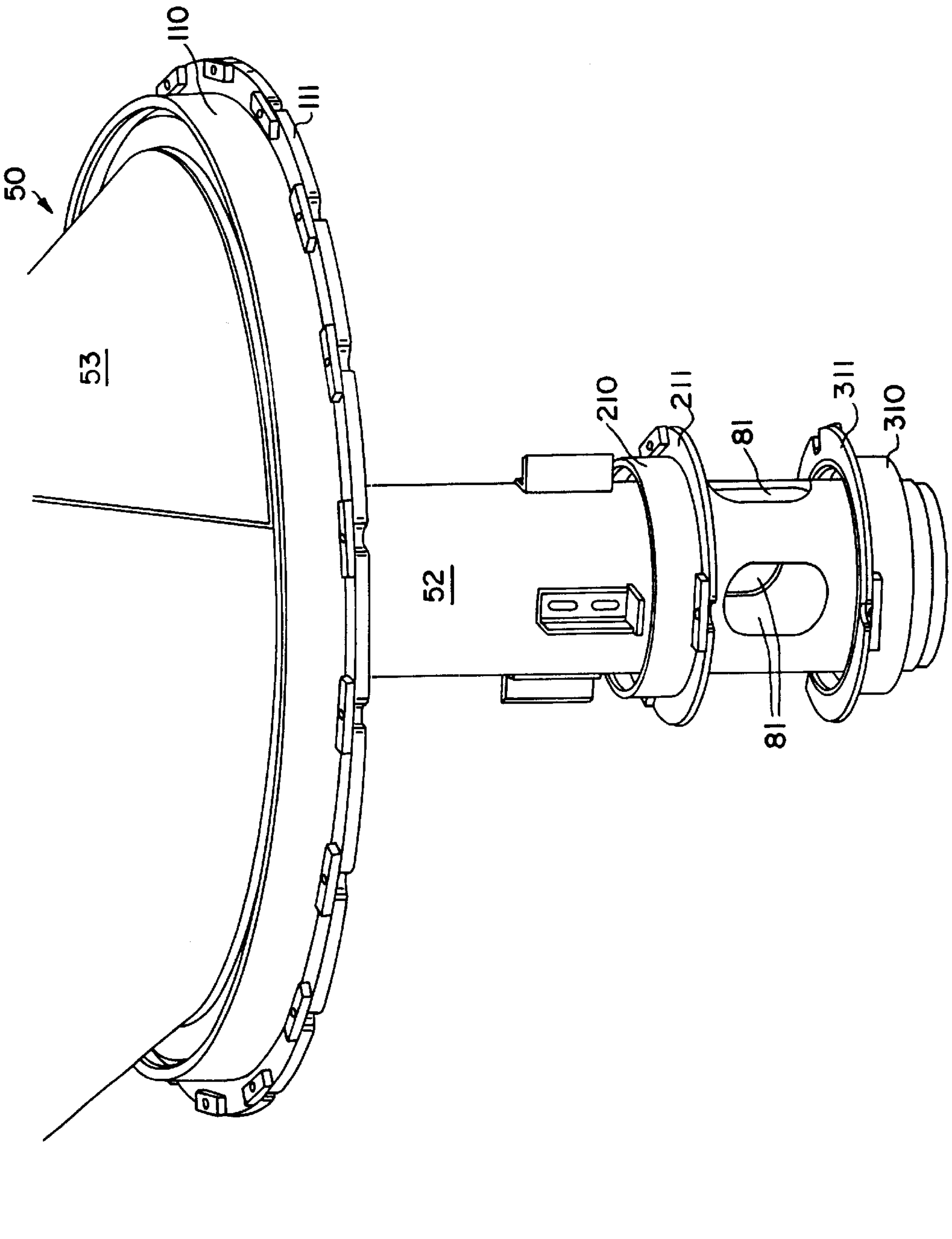
FIG. 10 is a perspective view of the shaft of the flow distributor in accordance with the present invention.

The flow distributor 50 includes a rotating port as best seen in FIGS. 10 and 11. The frusto-conical section 53 of the flow distributor 50 rotates about an annular cylindrical wall 110 that functions as an outer ring seal. The wall 110 includes an outer annular flange 111 used to center the wall 110 and clamp it to the manifold 51 (see also FIG. 5). An E-shaped inner ring seal member 116 (preferably made of metal) is coupled to the flow distributor 50 and has a pair of spaced parallel grooves 115A, 115B formed in it. Piston ring 112A sits in groove 115A, and piston ring 112B sits in groove 115B as shown. Each piston ring 112 biases against the outer ring seal wall 110, and remains stationary even as the flow distributor 50 rotates. Pressurized air (or gas) flows through the radial ducts 83 as shown by the arrows in FIG.

11, through apertures 84 communicating with each radial duct 83, and into the channel 119 between the piston rings 112A, 112B, as well as in the gap between each piston ring 112 and the inner ring seal 116. As the flow distributor rotates with respect to stationary cylindrical wall 110 (and the piston rings 112A, 112B), the air in channel 119 pressurizes the space between the two piston rings 112A, 112B, creating a continuous and non-friction seal. The gap between the piston rings 112 and the inner piston seal 116, and the gap 85 between the inner piston seal 116 and the wall 110, accommodate any movement (axial or otherwise) in the drive shaft 52 due to thermal growth or other factors. Those skilled in the art will appreciate that although a dual piston ring seal is shown, three or more piston rings also could be employed for further sealing. Positive or negative pressure can be used to seal.

FIG. 12 illustrates how the plenum 64 feeding the shaft 52 with pressurized air is sealed against the drive shaft 52. The sealing is in a manner similar to the rotating port discussed above, except that the seals are not pressurized, and only one piston ring need by used for each seal above and below the plenum 64. Using the seal above the plenum 64 as exemplary, a C-shaped inner ring seal 216 is formed by boring a central groove therein. A stationary annular cylindrical wall 210 that functions as an outer ring seal includes an outer annular flange 211 used to center the wall 210 and clamp it to the plenum 64. A stationary piston ring 212 sits in the groove formed in the C-shaped inner ring seal 216 and biases against the wall 210. The gap between the piston ring 212 and the bore of the C-shaped inner seal 216, as well as the gap between the C-shaped inner seal 216 and the outer cylindrical wall 210, accommodates any movement of the drive shaft 52 due to thermal expansion or the like. A similar cylindrical wall 310, C-shaped inner seal 316 and piston ring 312 is used on the opposite side of the plenum 64 as shown in FIG. 12.

In operation, in a first mode, untreated ("dirty") process gas flows into inlet 48, through passageway 61 of the flow distributor 50, and into which ever respective valve ports 25 that are in open communication with the passageway 61 in this mode. The untreated process gas then flows up through the hot heat exchange media supported by cold face plenum 20 and through the combustion zone where it is treated, and the now clean gas is then cooled as it flows down through the cold heat exchange media in a second column, through the valve ports 25 in communication with passageway 60, and out through plenum 47 and outlet 49. Once the cold heat exchange media becomes relatively hot and the hot heat exchange media becomes relatively cold, the cycle is reversed by activating the drive mechanism 70 to rotate drive shaft 52 and flow distributor 50. In this second mode, untreated process gas again flows into inlet 48, through passageway 61 of the flow distributor 50, which passageway is now in communication with different valve ports 25 that were previously only in fluid communication with passageway 60, thus directing the untreated process gas to the now hot heat exchange column and then through the combustion zone where the process gas is treated. The cleaned gas is then cooled as it flows down through the now cold heat exchange media in the other column, through the valve ports 25 now in communication with passageway 60, and out through plenum 47 and outlet 49. This cycle repeats itself as needed, typically every 1–4 minutes.

What is claimed is:

1. A valve, comprising:

a plurality of valve ports comprising at least a first valve port and a second valve port separate from said first valve port, said first and second valve ports each being divided into at least two chambers;

a flow distributor having an inlet passageway and an outlet passageway, said flow distributor being movable with respect to said plurality of valve ports between a first position in which said first valve port is in fluid communication with said inlet passageway and said second valve port is in fluid communication with said outlet passageway, and a second position in which said first valve port is in fluid communication with said outlet passageway and said second valve port is in fluid communication with said inlet passageway; each of said plurality of valve ports being in fluid communication with one of either said inlet passageway or said outlet passageway when said flow distributor is in said first position and being in fluid communication with the other of said inlet passageway or said outlet passageway when said flow distributor is in said second position; said flow distributor comprising a blocking surface which allows flow through each of said plurality of valve ports when said flow distributor is stationary, and blocks flow through a first portion of said first valve port and through a second portion of said second valve port only when said flow distributor is between said first and second positions, said flow distributor being rotatable in first and second opposite directions.

2. The valve of claim 1, wherein said first and second valve ports are each divided into at least three chambers.

3. The valve of claim 1, wherein said flow distributor is rotatable 180° between said first and second positions.

4. The valve of claim 1, wherein said first and second portions of said valve ports are congruent.

5. The valve of claim 1, further comprising a drive shaft coupled to said flow distributor; at least one radial duct in fluid communication with and extending radially from said drive shaft; and a rotating port comprising: an outer ring seal, an inner ring seal spaced from said outer ring seal and having a plurality of bores, and at least one piston ring, said at least one piston ring being positioned in a respective one of said plurality of bores in said inner ring seal and biasing against said outer ring seal.

6. The valve of claim 5, further comprising means for causing gas to flow through said drive shaft, through said at least one radial duct, and between said at least one piston ring and said inner ring seal.

7. The valve of claim 5, wherein there are a plurality of piston rings, and further comprising means for causing gas to flow through said drive shaft, through said at least one radial duct, and between said plurality of piston rings.

8. The valve of claim 1, further comprising a sealing plate, and wherein said flow distributor further comprises a mating surface having a plurality of apertures through which gas flows, creating a cushion of gas between said mating surface and said sealing plate.

9. The valve of claim 8, wherein said sealing plate comprises at least one annular groove aligned with at least one of said plurality of apertures.

10. The valve of claim 1, further comprising drive means for moving said flow distributor between said first and second positions.

11. The valve of claim 10, wherein said drive means comprises a gear coupled to said flow distributor, said gear having a plurality of spurs, and at least one rack having a plurality of grooves into which said plurality of spurs fit, whereby movement of said rack causes a corresponding movement of said gear, which rotates said flow distributor.

12. A valve, comprising:

a plurality of valve ports comprising at least a first valve port and a second valve port separate from said first valve port, said first and second valve ports being divided into at least two chambers;

a flow distributor positioned in a housing having an interior volume, said flow distributor having an inlet passageway and an outlet passageway, wherein one of said inlet and outlet passageways is always open to said interior volume of said housing for flow of gas therebetween, and the other of said inlet and outlet passageways is always closed from said interior volume; said flow distributor being movable in first and second opposite directions with respect to said plurality of valve ports between a first position in which said first valve port is in fluid communication with said inlet passageway and said second valve port is in fluid communication with said outlet passageway, and a second position in which said first valve port is in fluid communication with said outlet passageway and said second valve port is in fluid communication with said inlet passageway; said flow distributor comprising a blocking surface which allows flow through each of said plurality of valve ports when said flow distributor is stationary, and blocks flow through a first portion of said first valve port and through a second portion of said second valve port only when said flow distributor is between said first and second positions.

13. The valve of claim 12, wherein said blocking surface separates said inlet passageway from said outlet passageway.

14. The valve of claim 12, wherein said first position of said flow distributor is 180° removed from said second position of said flow distributor.

15. The valve of claim 1, wherein said flow distributor is rotatable in 180° intervals.

16. The valve of claim 12, wherein said flow distributor is rotatable in 180° intervals.

* * * * *